Patented Sept. 6, 1938

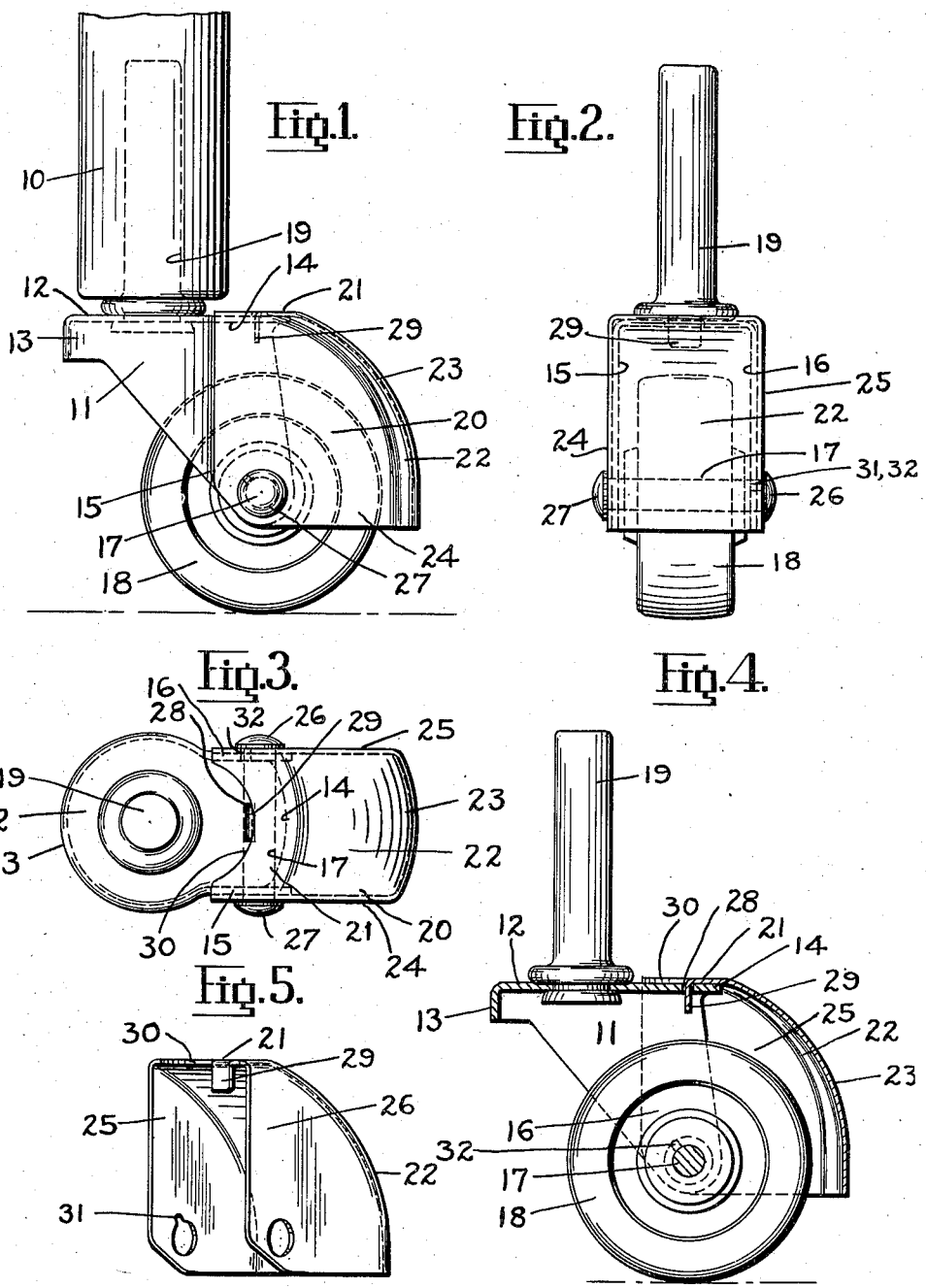

2,129,579

UNITED STATES PATENT OFFICE 2,129,579

CASTER

Walter F. Herold, Bridgeport, Conn., assignor to The Bassick Company, Bridgeport, Conn., a corporation of Connecticut Application December 24, 1936, Serial No. 117,607

1 Claim. (Cl. 16—18)

This invention relates to improvements in casters, and more particularly to casters for use on washing machines, ironing machines, office and other furniture having legs, comparatively small in diameter.

One object of the invention is to provide a caster having a protecting guard extending over and depending about the wheel of the caster, and so arranged as to protect the caster wheel from liquid splashing thereon and upon its bearings in the case of washing machines or the like, to protect articles being ironed against contact with the wheel in the case of ironing machines, and to protect adjacent articles, and the shoes of any one using an article of furniture, in the case of office chairs or other articles of furniture.

Another object is to provide a caster with a guard which will not interfere with the operation of the caster and which will provide an attractive finish to the end of the legs of the machine or article of furniture upon which it is applied.

It is particularly proposed to provide an improved guarded caster in which the guard will be separately formed from the caster horn, thereby permitting deep shapes to be obtained by drawing sheet metal, which shapes would be difficult and impractical to obtain in a one piece horn and guard.

With the above and other objects in view which will appear as the description proceeds, the invention consists in the novel features and combinations of parts to be hereinafter described, with reference to the accompanying drawing wherein a preferred embodiment of the invention is illustrated, and which are particularly pointed out and defined in the claim.

In the drawing:

Fig. 1 is a side elevation of a caster embodying the features of this invention and shown applied to a leg of a machine or other article.

Fig. 2 is a front elevational view of the caster removed from the leg.

Fig. 3 is a top plan view of the same.

Fig. 4 is a vertical sectional view.

Fig. 5 is a view of the guard element before assembly with the other elements of the caster.

Referring now to the drawing wherein like reference characters designate like elements throughout the various figures of the drawing, 10 indicates the leg of a machine or article of furniture to which the caster of this invention is adapted to be applied. The caster illustrated includes a horn 11 having an upper flat portion 12 provided at its forward edge with a depending peripheral flange 13, and a rearwardly directed lip 14. The sides of the horn 11 are extended rearwardly and downwardly to form spaced apart side bearing means 15 and 16 for the axle 17 of a caster wheel 18. A vertically disposed pintle 19, suitably secured to the upper flat portion 12 of the horn 11, is adapted to be inserted into the leg 10 as shown in Figure 1.

A wheel guard 20 preferably formed from sheet metal has a top portion 21 adapted to rest upon and extend over the top flat portion 12 of the caster, and a back portion 22 curved rearwardly and downwardly over the wheel 18 to a point slightly below the axis of the wheel, the back portion 22 being somewhat domed as at 23 to provide a curved smooth surface therefor. The guard 20 is also provided with spaced apart side portions 24 and 25 extending forwardly from the back portion 22 and downwardly from its top portion 21. Herein the guard side portions 24 and 25 are shown coinciding with the caster side members 15 and 16, and the axle 17 of the wheel 18 is shown passed through suitable aligned openings in the respective parts and is headed at each end as at 26 and 27 adjacent and over the outer side of the guard side portions 24 and 25. The flat top portion 12 of the horn 11 has a slot 28 formed therein adjacent its rearward end to receive a tongue 29 formed on and extending from the front edge 30 of the top portion 21 of the guard 20. In accordance with the usual practice the opening in the one of the side portions 24 and 25 of the guard 20 is provided with a notch 31 to receive a lug 32 formed on the axle 17 adjacent a preformed head 26, to keep the axle from turning when the head 27 is formed during the assembly of the parts.

The provision of a cooperating tongue and slot, one on the horn element and one on the guard element, with the axle openings in each coinciding, permits rapid, rigid and efficient assembly of those elements. When assembling the elements together the top portion 21 of the guard 20 is disposed over the top flat portion 12 of the horn 11 and the tongue 29 is inserted into the slot 28. The guard is then swung forwardly to coincide the axle openings in the sides 24 and 25 thereof with those in the horn sides 15 and 16, the wheel 18 is disposed in place between the horn sides 15 and 16 and the axle 17 is passed through these elements and headed over as at 27.

When in assembled form as shown in Figs. 1, 2 and 3 the caster wheel is protected by the guard element 20 against drippings or splashings from a washing machine or the like, the rear edge of the horn top portion 21 and the wheel 18 is covered, protecting the heels of a user of the article to which the caster is applied especially in case it is an office chair, and other articles are protected against contact with the caster wheel 18 during the use of the article to which it is applied, or the movement thereof about the room.

While a preferred embodiment of this invention has been illustrated and described, it is to be understood that the same is not to be limited thereto in all of its details as the same may be modified and changed without departing from the spirit and scope of the invention as defined in the appended claim.

What is claimed and for which it is desired to secure Letters Patent is:

In a caster, a horn element having a top portion and spaced apart side portions extending downwardly and having aligned axle receiving apertures, a wheel disposed between said side portions, a guard element extending downwardly over said wheel from the top portion of said horn element and having spaced apart depending sides adapted to engage said side portions of the horn element and having aligned axle receiving apertures, and a wheel axle passing through said wheel and through said aligned apertures of said horn and guard to secure the same together.

WALTER F. HEROLD.